(12) United States Patent
Shimizu (10) Patent No.: US 8,875,599 B2
(45) Date of Patent: Nov. 4, 2014

(54) WIRE STRIPPING APPARATUS

(75) Inventor: Tokichi Shimizu, Kiryu (JP)

(73) Assignee: Tokyo Ideal Co., Ltd, Chuo-Ku, Tokyo (JP)

( * ) Notice: Subject to any disclaimer, the term of this patent is extended or adjusted under 35 U.S.C. 154(b) by 966 days.

(21) Appl. No.: 13/007,352

(22) Filed: Jan. 14, 2011

(65) Prior Publication Data

US 2011/0174115 A1    Jul. 21, 2011

(30) Foreign Application Priority Data

Jan. 18, 2010 (JP) ................................. 2010-008616

(51) Int. Cl.
*H02G 1/12* (2006.01)

(52) U.S. Cl.
CPC ........... *H02G 1/1256* (2013.01); *H02G 1/1248* (2013.01); *H02G 1/12* (2013.01); *H02G 1/1275* (2013.01); *H02G 1/1278* (2013.01); *H02G 1/1251* (2013.01)
USPC .................. 81/9.51; 81/9.4; 83/880

(58) Field of Classification Search
CPC . H02G 1/1278; H02G 1/1265; H02G 1/1275; H02G 1/12; H02G 1/1248; H02G 1/1251; H02G 1/1256
USPC ......................... 81/9.51, 9.41, 9.42, 9.43, 9.44
See application file for complete search history.

(56) References Cited

U.S. PATENT DOCUMENTS

| 3,765,276 | A | * | 10/1973 | Pollitt | ............................. 81/9.51 |
| 4,920,830 | A | | 5/1990 | Stepan | |
| 4,951,530 | A | * | 8/1990 | Cross | .............................. 81/9.51 |
| 5,269,206 | A | * | 12/1993 | Yagawa | ......................... 81/9.51 |
| 6,370,759 | B1 | | 4/2002 | Shimizu | |

FOREIGN PATENT DOCUMENTS

| JP | 60-255004 A | 12/1985 |
| JP | 5-284622 A | 10/1993 |
| JP | 06-022425 A | 1/1994 |
| JP | 7-99712 A | 4/1995 |
| JP | 2000-350324 A | 12/2000 |
| JP | 2006-197716 A | 7/2006 |

* cited by examiner

*Primary Examiner* — Monica Carter
*Assistant Examiner* — Melanie Alexander
(74) *Attorney, Agent, or Firm* — Christensen O'Connor Johnson Kindness PLLC (57) ABSTRACT

A wire stripping apparatus is disclosed. The apparatus comprises a clamping device for holding a first portion, a cutter having a plurality of first edges, the first edges being movable toward and away from one another in a first direction wherein the first edges provide a cut in the insulation of the wire at the second portion, and a remover having a plurality of second edges, the second edges being movable toward and away from one another in a second direction different from the first direction wherein the second edges move toward one another to grasp a third portion adjacent to the second portion of the wire away from the first portion of the wire. The remover is movable in the lengthwise direction of the wire wherein the remover moves in the lengthwise direction of the wire away from the first portion to remove the insulation from the wire.

8 Claims, 9 Drawing Sheets

WIRE STRIPPING APPARATUS

TECHNICAL FIELD

The present invention relates to a wire stripping apparatus for stripping an insulation layer from a wire.

BACKGROUND

An electrical wire generally comprises an inner core of conductor that is surrounded by an insulation layer. When the electrical wire is joined to other wires or connected to a terminal, the insulation needs to be removed. The purpose of a wire stripping apparatus is to remove the insulation from around the core of the wire to expose the core of the wire.

The wire stripping apparatus disclosed in Japanese unexamined publication JP2000-350324 comprises a pair of V-shaped cutters that are provided opposite to an insulated wire and blades of the cutters are moved toward the insulated wire to cut into the insulation from opposite sides without damaging the core, and the cutters are caused to move in the lengthwise direction of the wire to remove the insulation.

According to this type of stripper in which the blades are caused to move in the length of the wire, if cross sectional shapes of wire and/or core are not uniform in the lengthwise direction of wire or if an adhesion between the core and the insulation is strong, it may be difficult to strip the insulation from the wire properly. Moving the blades cutting into the insulation along the lengthwise direction of the wire may result in damage to the core.

Japanese unexamined publication H06-22425 relates to an assisting tool for wire stripping in which a cut is formed in the insulation by using heated blades. In stripping the insulation using this tool, a separate process is required to pull out the insulation from an end of the wire. It is difficult to pull the insulation if the length of the insulation to be removed is short. It is also difficult to twist strands of the core by pulling out the insulation to keep the strands together.

The present invention is directed to provide a wire stripping apparatus which facilitates easy and effective stripping an insulation from a wire while eliminating damages to a core.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to an embodiment of the present invention, a wire stripping apparatus for stripping a wire having a core and an insulation around the core is provided. The apparatus comprises: a clamping device for holding a first portion of a wire comprising a core and an insulation around the core; a cutter having a plurality of first edges, the first edges being movable toward and away from one another in a first direction wherein the first edges move toward one another to contact a second portion of the wire so as to provide a cut in the insulation of the wire at the second portion of the wire; a remover having a plurality of second edges, the second edges being movable toward and away from one another in a second direction different from the first direction wherein the second edges move toward one another to grasp a third portion of the wire adjacent to the second portion of the wire away from the first portion of the wire; and the remover being movable in the lengthwise direction of the wire wherein the remover grasping the third portion of the wire moves in the lengthwise direction of the wire away from the first portion of the wire to remove the insulation from the wire.

In an embodiment, the edges of the cutter and said second edges of the remover are movable in orthogonal directions substantially perpendicular to the lengthwise direction of the wire.

In an embodiment, the first edges are adapted to be heated to provide the cut by melting the insulation.

In an embodiment, the first edges comprise a blade cutting into the insulation.

In an embodiment, the cutter is rotatable about an axis of the wire and the first edges contacting the wire rotates about the axis of the wire to provide the cut in the insulation at the second portion of the wire.

In an embodiment, the remover is rotatable about an axis of the wire and the remover grasping the wire moves in the lengthwise direction of the wire away from the first portion of the wire while simultaneously rotating about the axis of the wire to remove the insulation from the wire. It is possible to remove the insulation from the wire and twisting the core at the same time.

The embodiments of the present invention employ a cutter for providing a cut in an insulation of a wire and a remover for removing the insulation as separate elements so that an effective stripping of the insulation is performed without damages to a core of the wire. The first clamping elements of the cutter and the second clamping elements of the remover move toward and away from the wire in different directions so that the first clamping elements and the second clamping elements can clamp substantially the same portion of the wire without interfering with each other.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
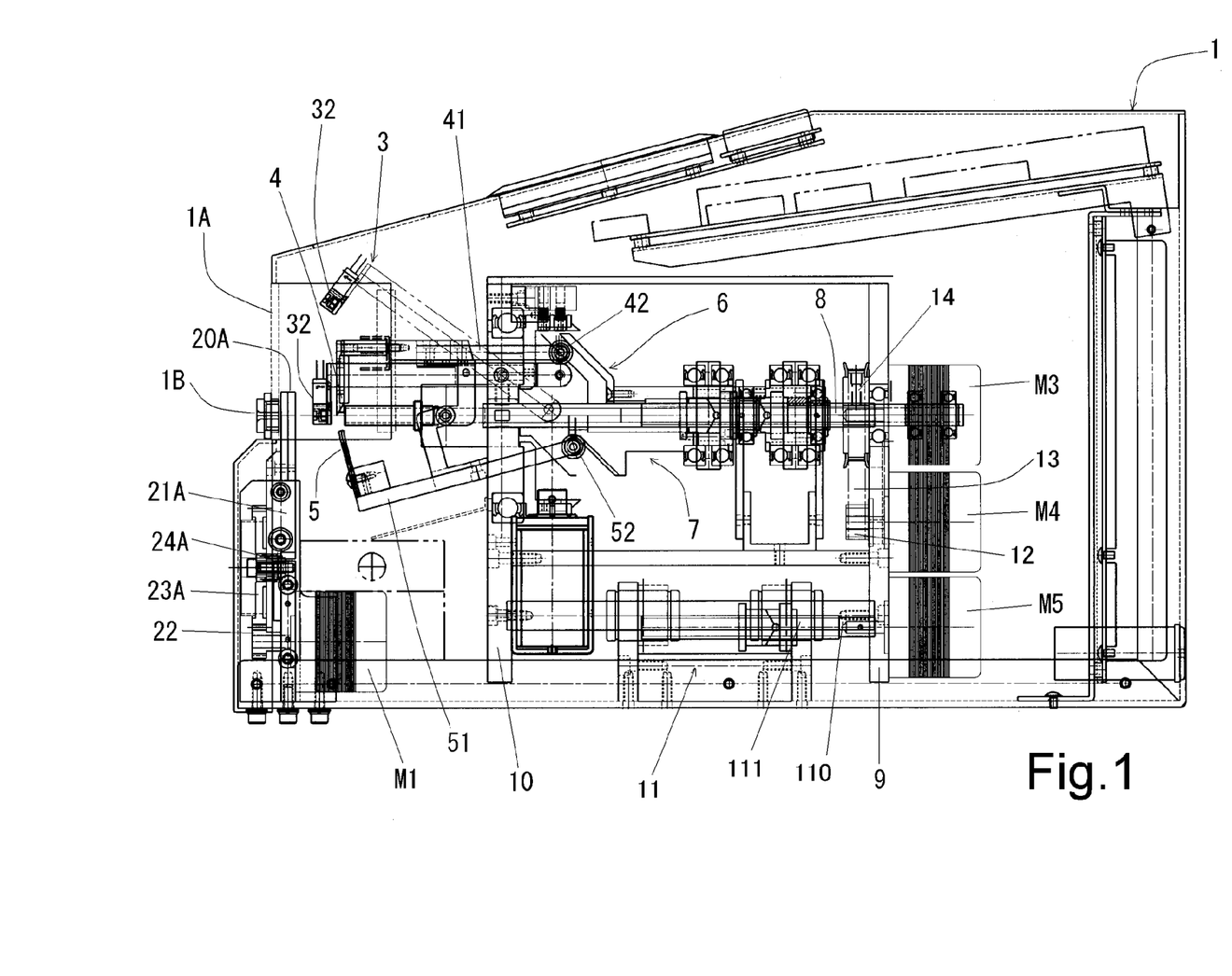
FIG. 1 is an overall schematic view of a wire stripping apparatus in which elements of a stripping mechanism are partially omitted.
Figure 2:
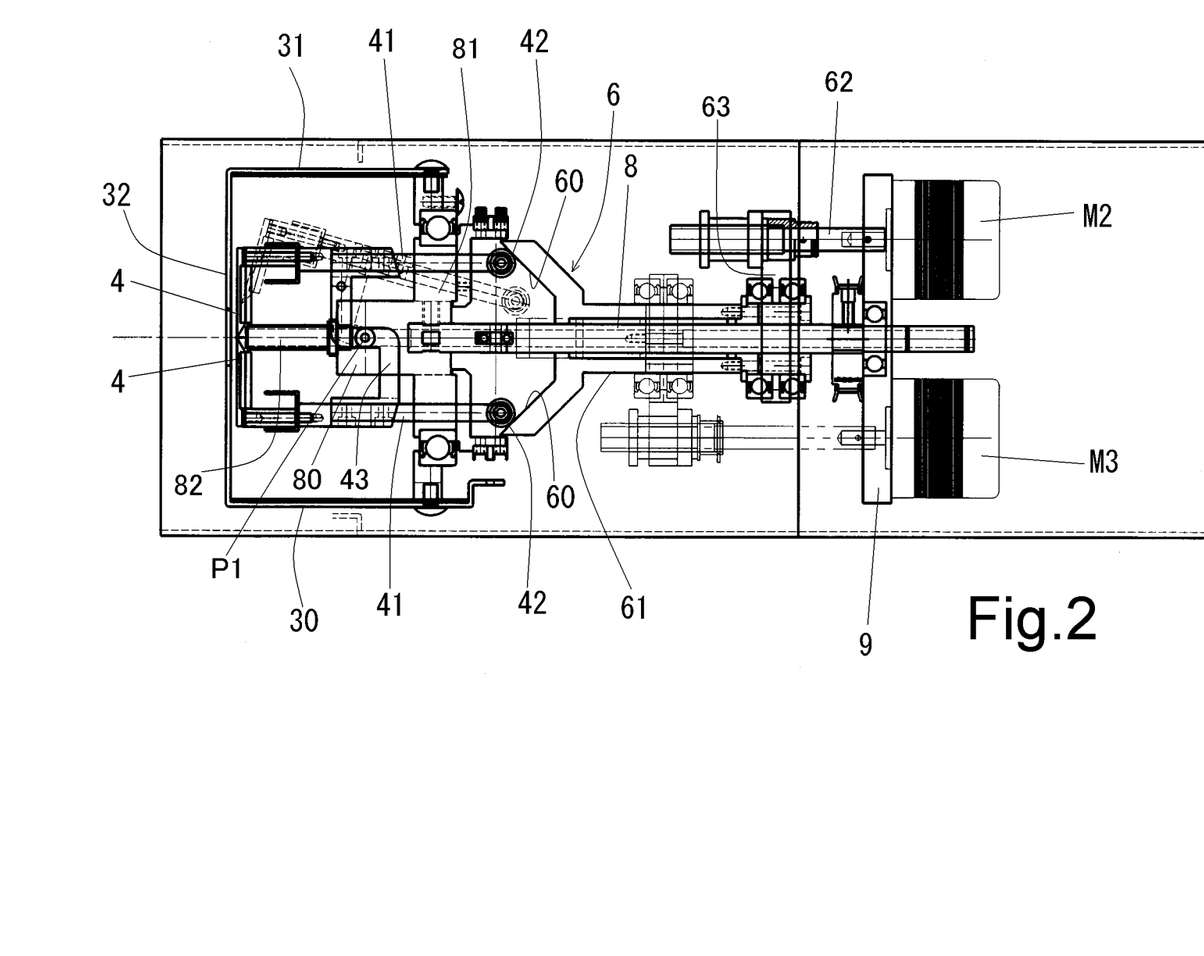
FIG. 2 is a plan view of the stripping mechanism in which a second clamping elements and a second actuator are omitted.
Figure 3:
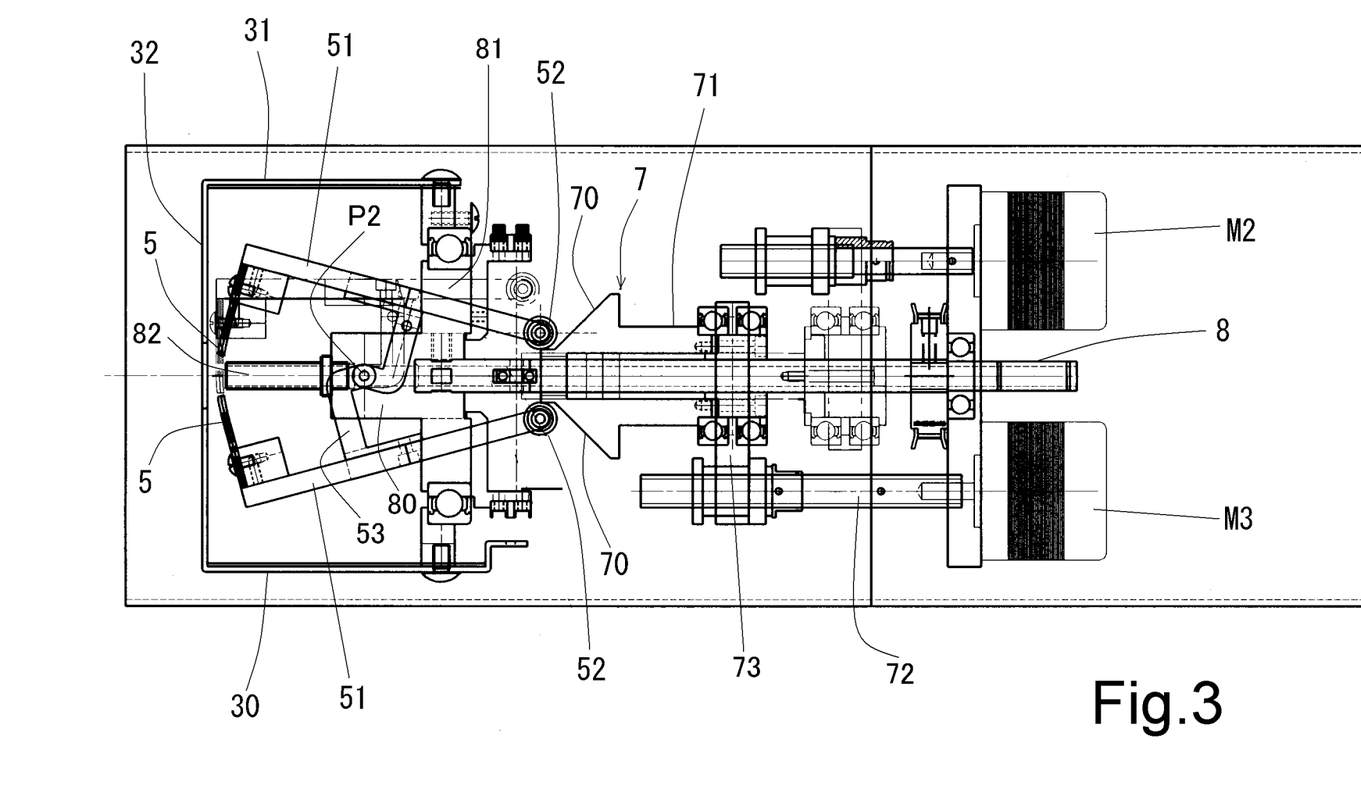
FIG. 3 is a plan view of the stripping mechanism in which a first clamping elements and a first actuator are omitted.

FIG. 1 is a schematic view of a wire stripping apparatus according to an embodiment. The stripping apparatus comprises a casing 1 and a stripping mechanism housed in the casing 1. In FIG. 1, elements of the stripping mechanism, which are fully described in FIGS. 2 and 3, are partially omitted. The casing 1 is a longitudinal box having a front side and a rear side. The casing 1 defines a front face 1A in which a wire insertion aperture 1B for receiving a wire is provided. Inside the casing 1, a clamping device 2 for clamping a wire is provided adjacent to the wire insertion aperture 1B and the wire is clamped by the clamping device 2 during stripping the wire. A position of the wire to be clamped by the clamping device 2 is determined by a positioning device 3 provided on the stripping apparatus.

Figure 4:
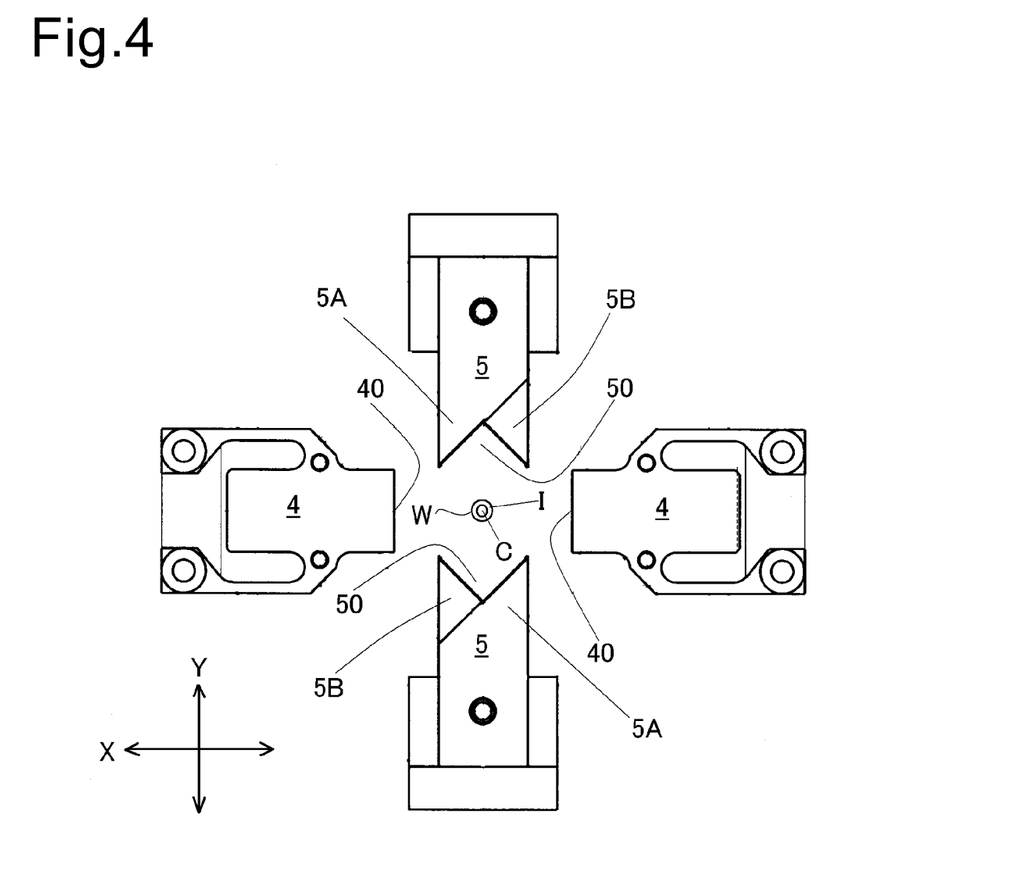
FIG. 4 shows the first clamping elements and the second clamping elements in which the first and second clamping elements are in a cross-like configuration as viewed from the front of the apparatus.
Figure 5:
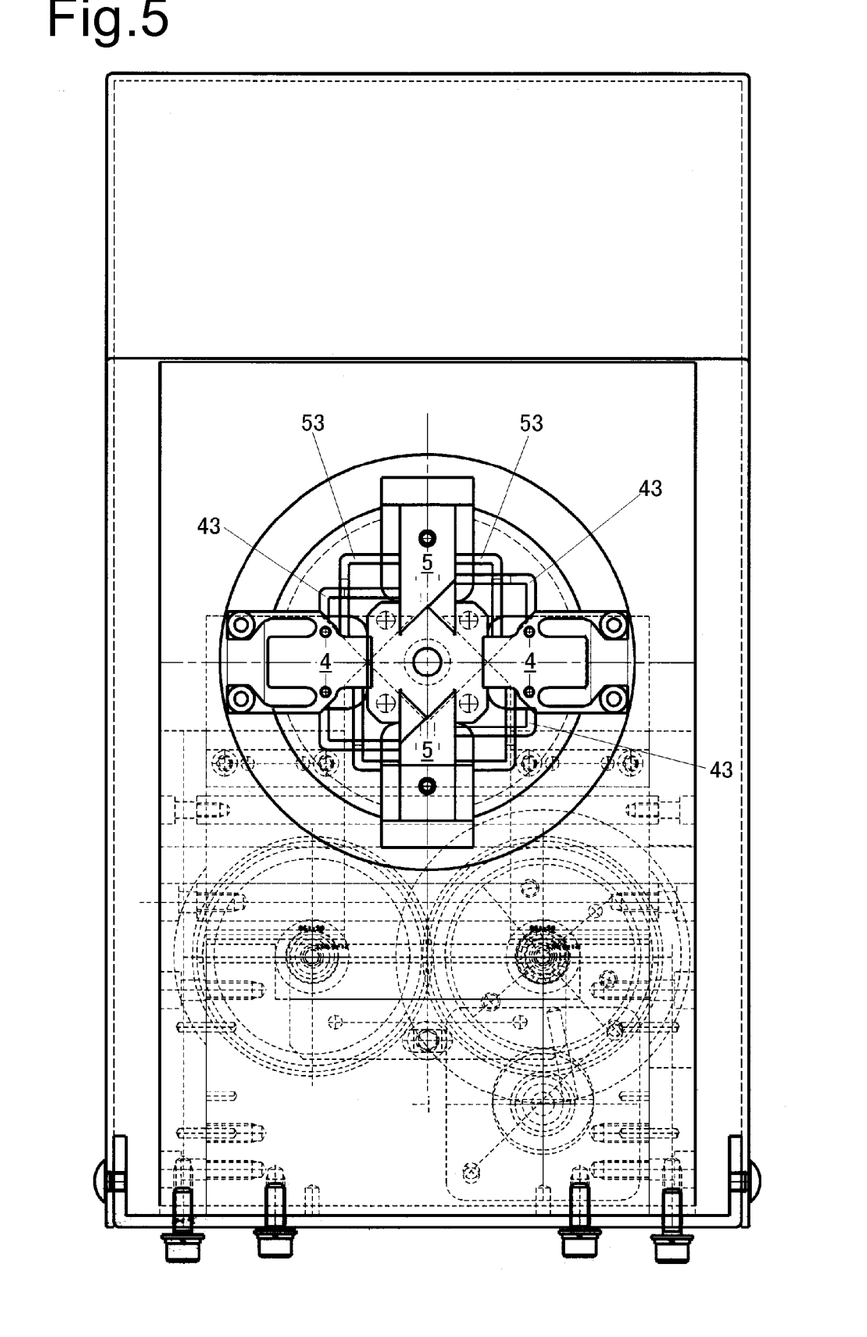
FIG. 5 is a view of the wire stripping apparatus of FIG. 1 as viewed from the front.

The stripping mechanism of the wire stripping apparatus comprises a cutter having a first pair of clamping elements 4 and a remover having second pair of clamping elements 5. Referring to FIG. 4, the first pair of clamping elements 4 comprises a pair of edges 40 which are movable toward and away from one another. When the edges 40 move toward each other and contact a wire W, a cut is formed in an insulation I of the wire W by the edges 40. The second pair of clamping elements 5 comprises a pair of edges 50 which are movable toward and away from one another. The edges 50 are adapted to grasp a portion of the wire immediately adjacent to the cut formed by the first pair of clamping elements 4 on the side opposite the clamping device 2. The first pair of clamping elements 4 and the second pair of clamping elements 5 are movable in different directions one another substantially perpendicular to an axis of the wire. In an embodiment, the first pair of clamping elements 4 is movable in an X direction and the second pair of clamping elements 5 is movable in a Y direction orthogonal to the X direction.

The stripping mechanism further comprises a first actuator 6 for causing the first clamping elements 4 to move toward and away from one another, a second actuator 7 for causing the second clamping elements 5 to move toward and away from one another, a shaft 8 extending along the lengthwise direction of the casing 1, a rear wall 9 for supporting a rear end of the shaft 8 and a front wall 10 for supporting a front end of the shaft 8.

The rear end portion of the shaft 8 is rotatably supported by the rear wall 9 via a bearing. The forward end portion of the shaft 8 comprises a head portion 80 with a circular plate-like portion 81 having a larger diameter and an extended portion 82 extended forwardly from the head portion 80. The forward end portion of the shaft 8 is rotatably supported via a bearing provided between an inner circumference in the front wall 10 and an outer circumference of the circular plate-like portion 81. The shaft 8 comprises a hollow portion and open ends so as to function as a collecting pipe for stripped insulation.

The first actuator 6 is reciprocally movable along the lengthwise direction of the shaft 8 by a motor M2. The second actuator 7 is reciprocally movable along the lengthwise direction of the shaft 8 by a motor M3. The shaft 8 is actuated to rotate by a motor M4 and gears 12 and 14 provided at a rear side of the shaft 8. The gear 12 is rotated by the motor M4 and is coupled to the gear 14 by a toothed belt 13 such that the shaft 8 is actuated to rotate by rotating the gears 12 and 14 with the motor M4. The first actuator 6 and the second actuator 7 are rotated together with the rotation of the shaft 8. The stripping mechanism is movable along the lengthwise direction within the casing 1 by a slide mechanism. The slide mechanism comprises an LM shaft 110 and a linear bush 111.

Figure 6:
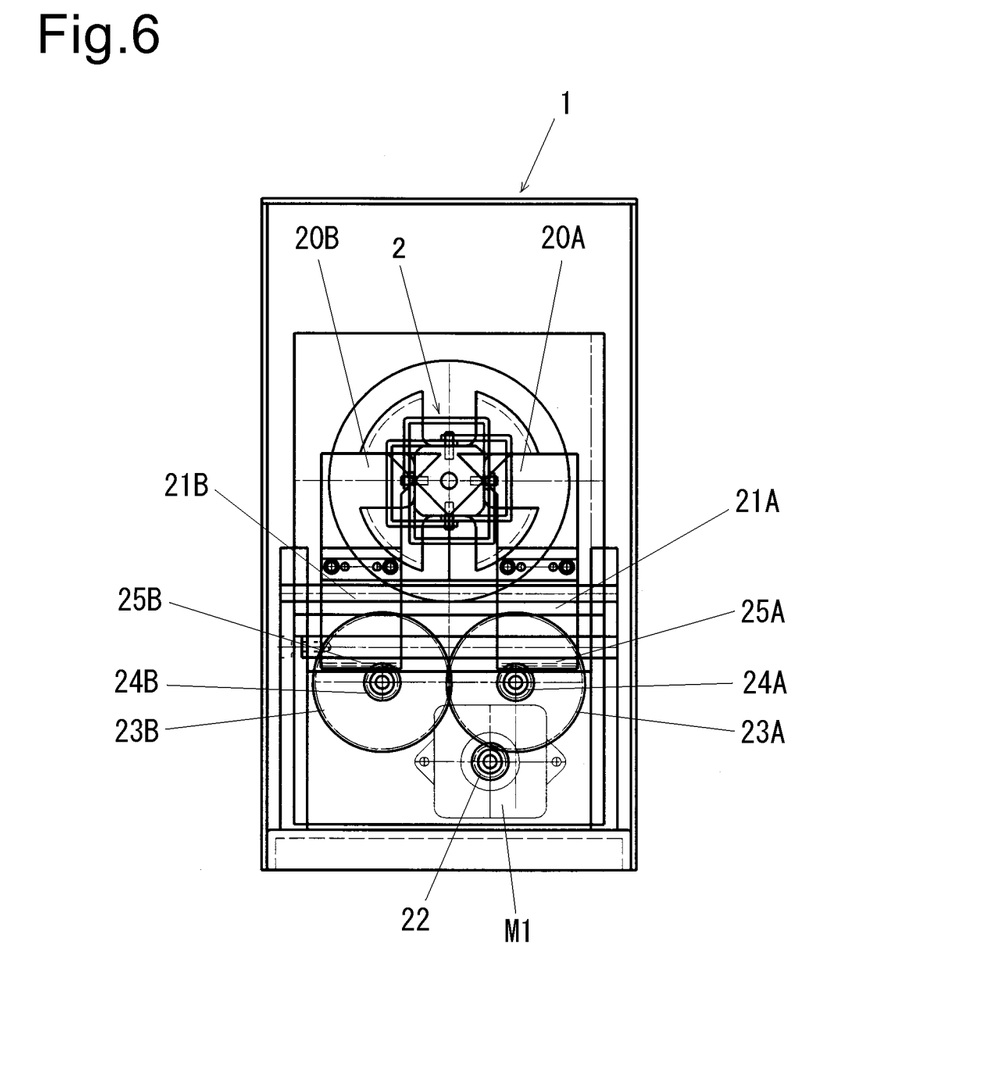
FIG. 6 is a view illustrating a clamping device.

Referring to FIG. 6, the clamping device 2 comprises left and right clampers 20A and 20B and an actuating mechanism for actuating clampers 20A and 20B. Clampers 20A and 20B comprise a pair of V-shaped edges being movable toward and away from one another. The actuating mechanism comprises movable blocks 21A and 21B for causing the clampers 20A and 20B to reciprocally move in the lateral direction and a motor M1 for causing the movable blocks 21A and 21B to reciprocally move in the lateral direction orthogonal to the lengthwise direction of the wire. A first gear 22 is rotated by the rotation of the motor 1 and a second gear 23A having a larger diameter is rotated together with the rotation of the first gear 22. A third gear 23B having a larger diameter is geared to the second gear 23A such that the second gear 23A and the third gear 23B rotate together in opposite directions. A fourth gear 24A and a fifth gear 24B both having a smaller diameter are rotated together with the rotations of the second gear 23A and the third gear 23B. A first rack 25A geared to the fourth gear 24A and a second rack 25B geared to the fifth gear 24B are movable toward and away from one another in the lateral direction so as to clamp the wire between V-shaped edges of the clampers 20A and 20B.

The positioning device 3 comprises left and right rotatable bars 30 and 31, and a positioning bar 32 connected between the forward portions of the rotatable bars 30 and 31. The positioning device 3 is rotatable between a horizontal positioning position and an upwardly tilted escape position. When the tip of the wire received in the wire insertion aperture 1B contacts a sensor of the positioning bar 32 in the horizontal position, the motor M1 is actuated to cause the clamping device 2 to clamp the wire. The stripping mechanism with the positioning device mounted is movable along the lengthwise direction within the casing 1 and the position of the sensor of the positioning bar 32 relative to the front wall 1A can be variable such that the clamping position can be adjusted by setting the position of the positioning bar 32.

The first clamping elements 4 are a pair of jaws provided at each of forward ends of a pair of swing arms 41. The swing arm 41 is provided with the jaw at a forward end and a guide roller 42 at a rear end. The swing arm 41 is coupled to a pivot P1 provided at the head portion 80 of the shaft 8 via a supporting arm 43. The pair of swing arms 41 pivots about the pivot P1 such that the forward ends are open or closed. The edges 40 of first clamping elements 4 move away from one another when the swing arms 41 rotate in a direction where the forward ends of the swing arms 41 are open. The edges 40 of first clamping elements 4 move toward each other when the swing arms 41 rotate in a direction where the forward ends of the swing arms 41 are closed.

The pair of swing arms 41 is spring-biased in a direction where the front ends are closed. Thus, the clamping elements 4 elastically clamp the wire by a spring force so that the edges of the first clamping elements 4 follow the shape/contour of the wire to form a cut in the insulation property.

The pivotal movements of swing arms 41 are obtained by the first actuator 6 that is reciprocally movable along the lengthwise direction of the shaft 8. The first actuator 6 comprises a front portion defining a pair of angled guide surfaces 60 provided at the forward side and an elongated base portion 61 integrally formed with the front portion and extended rearwardly along the lengthwise direction of the shaft 8. The base portion 61 is slidably mounted along the lengthwise direction of the shaft 8. A lead screw 62 is provided at the rear wall 9 and is to be rotated by the motor M2. The lead screw 62 is provided with a movable body 63 that moves on the lead screw 62 with the rotation of the screw 62. The lead screw 62 extends in parallel to the shaft 8 and the movable body 63 is connected to the base portion 61 such that the first actuator 6 moves along the lengthwise direction of the shaft 8 with the rotation of the lead screw 62. The first actuator 6 is movable along the lengthwise direction of the shaft 8 between a rearward first position and a forward second position.

The forward ends of the swing arms 41 are open or closed with guide rollers 42 at the rear ends being guided by the angled guide surfaces 60 that function as a cam. When the first actuator 6 is in the rearward first position, the guide rollers 42 contact the forward end of the guide surfaces 60 and the forward ends of the swing arms 41 are closed where the edges of the clamping elements 4 are close to each other as shown in FIG. 2. When the actuator 6 moves forwardly from the rearward first position, guide rollers 42 move rearwardly relative to the guide surfaces 60 and are guided by the angled guide surfaces 60 to move toward each other so that the forward ends of the swing arms 41 are open and the edges 40 of the clamping elements 4 moved away from each other.

The edges 40 of the first clamping elements 4 are parallel opposed thin edges. The first clamping elements 4 are adapted to be heated by a heater to several hundred degrees, 300 to 500 degrees Celsius for example. An electric supply is brought to the heater by a slip ring. The first clamping elements 4 are heated so that a cut is formed in the insulation I of the wire W by melting the insulation I with the heat of heated edges 40. The first clamping elements 4 are rotatable around the wire with the rotation of the shaft 8. The first clamping elements 4 with edges 40 contacting the insulation of the wire are rotated to form the cut around the insulation. The first clamping elements 4 may comprise a sharp blade cutting into the insulation 2 as disclosed in U.S. Pat. No. 6,370,759, for example, which is incorporated herein by reference. The first clamping elements 4 may be detachable so as to select the type of cutter, i.e. heat or blade.

The second clamping elements 5 are a pair of jaws provided at each of forward ends a pair of swing arms 51. The swing arm 51 is provided with the jaw at a forward end and a guide roller 52 at a rear end. The swing arm 51 is coupled to a pivot P2 provided at the head 80 of the shaft 8 via a supporting arm 53. The pair of swing arms 51 pivots about the pivot P2 such that the forward ends are open or closed. The edges 50 of second clamping elements 5 move away from one another when the swing arms 51 rotate in a direction where the forward ends of the swing arms 51 are open and the edges 50 of second clamping elements 5 move toward each other when the swing arms 51 rotate in a direction where the forward ends of the swing arms 51 are closed.

The pivotal movements of swing arms 51 are obtained by the second actuator 7 that is reciprocally movable along the lengthwise direction of the shaft 8. The second actuator 7 comprises a front portion defining angled guide surfaces 70 provided at the forward side and a base portion 71 integrally formed with the front portion and extended rearwardly along the lengthwise direction of the shaft 8. The base portion 71 is slidably mounted along the lengthwise direction of the shaft 8. A lead screw 72 is provided at the rear wall 9 and is to be rotated by the motor M3. The lead screw 72 is provided with a movable body 73 that moves on the lead screw 72 with the rotation of the screw 72. The lead screw 72 extends in parallel to the shaft 8 and the movable body 73 is connected to the base portion 71 such that the second actuator 7 moves along the lengthwise direction of the shaft 8 with the rotation of the lead screw 72. The second actuator 7 is movable along the lengthwise direction of the shaft 8 between a rearward first position and a forward second position.

The forward ends of the swing arms 51 are open or closed with guide rollers 52 at the rear ends being guided by the angled guide surfaces 70 that function as a cam. When the second actuator 7 is in the rearward first position, the guide roller 52 contacts the forward ends of the guide surfaces 70 and the forward ends of the swing arms 51 are open. When the actuator 7 moves forwardly from the rearward first position, guide rollers 52 move rearwardly relative to the guide surfaces 70 and are guided by the angled guide surfaces 70 to move away from one another so that the forward ends of the swing arms 51 move toward each other and the edges 50 of the clamping elements 5 are close to each other.

The edges 50 of the second clamping elements 5 are V-shaped edges. The edge 50 is provided with a plurality of teeth so as to grasp the wire W firmly. Each second clamping element 5 is formed by overlapping two plates 5A and 5B having an angled edge extending at an angle of 45 degrees to provide the V-shaped edge. When the pair of second clamping elements 5 moves close to each other, an end portion of the plate 5A of one clamping element overlaps an end portion of the plate 5B of the other clamping element and an end portion of the plate 5B of one clamping element overlaps an end portion of the plate 5A of the other clamping element. The end portions of clamping elements 5 are slightly curved toward the tips such that the end portions of clamping elements 5 are overlapped smoothly when the edges 50 of the clamping elements 5 provided at the forward ends of the swing arms 51 are close to each other.

The second clamping elements 5 are rotatable around the wire together with the rotation of the shaft 8. When the pair of second clamping elements 5 grasping the wire W moves rearwardly while simultaneously rotating, the insulation I is removed and the core C is twisted by the edges 50 of the second clamping elements 5. The wire W is comprised of a conductive core surrounded by an insulation layer, and the core is generally comprised of a bundle of multiple fine strands. According to the present embodiment, exposed strands are twisted by the rotating second clamping elements 5 without spreading out when removing the insulation.

When the edges 50 of the second clamping elements 5 are close to each other, an opening of the forward end of the shaft 8 (the extended portion 82) is positioned behind the closed edges 50 so that a stripped insulation can be collected from the opening of the shaft 8 through the hollow portion of the shaft 8 by suction means provided at the rear side of the shaft 8.

The stripping apparatus defines an axis that is substantially coincident with the lengthwise direction of the wire or coaxial with the wire. Both the first clamping elements 4 and the second clamping elements 5 move toward and away from one another with respect to the axis and also rotate about the axis. The second clamping elements move along the axis while simultaneously rotating about the axis.

Figure 7:
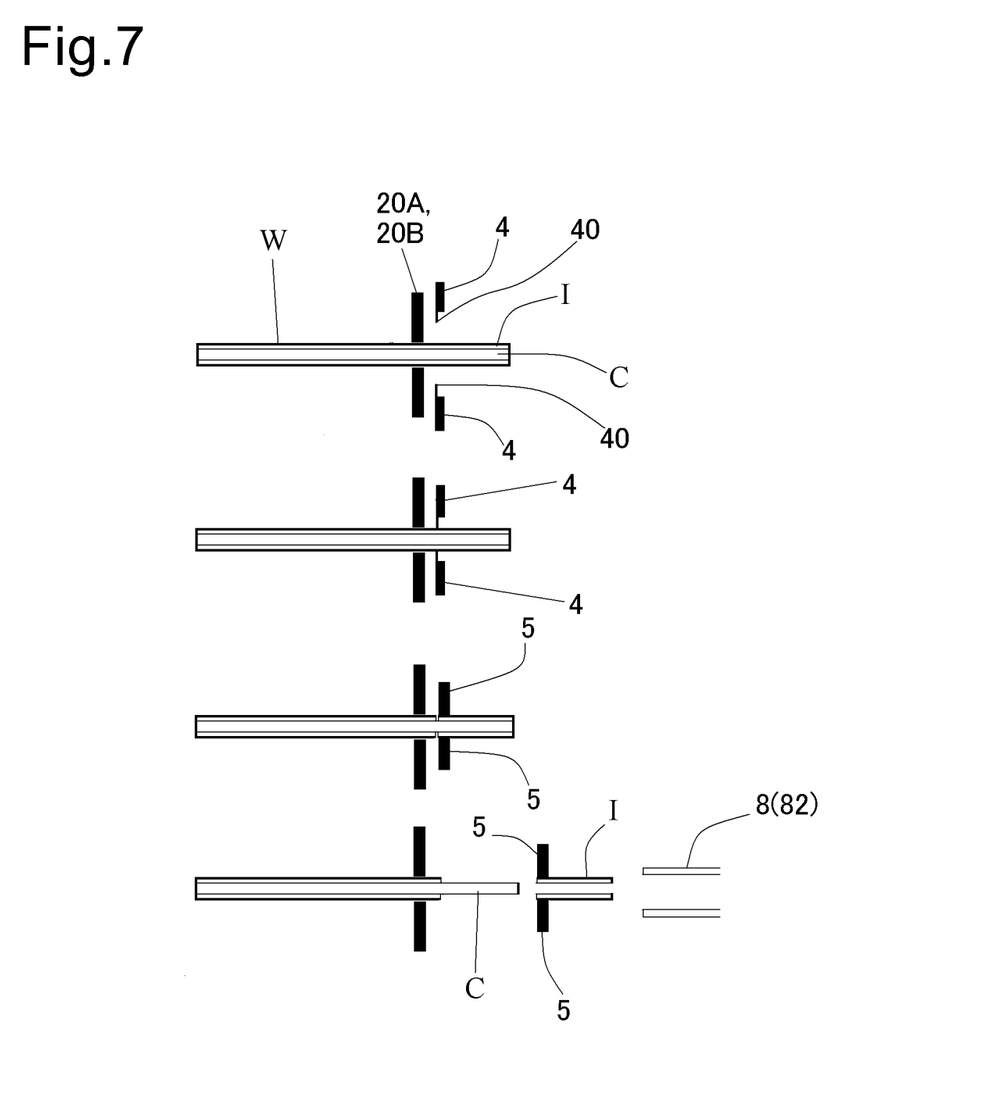
FIG. 7 shows steps for removing an insulation layer from an end portion of a wire.

Wire stripping processes using the wire stripping apparatus will be described. A predetermined length of wire W is provided. The wire W is inserted into the wire insertion aperture 1B in the front wall 1A. When the tip of the wire W contacts the sensor of the positioning bar 32, the motor M1 is actuated to cause the clampers 20A and 20B of the clamping device 2 to clamp the wire W. Simultaneously, the positioning bar 32 moves upward away from the wire. At this point, the edges 40 of the first clamping elements 4 as well as the edges 50 of the second clamping elements 5 are kept apart.

When the motor M2 is actuated to rotate the lead screw 62 so as to move the first actuator 6 rearwardly, the guide rollers 42 are guided on the guide surfaces 60 of the first actuator 6 and the swing arms are caused to pivot such that the forward ends of the swing arms 41 move toward each other by the spring force and the rear ends of the swing arms 41 move away from each other.

When the guide rollers 42 move to the front end of the guide surfaces 60, the edges 40 of the first clamping elements 40 contact the insulation, followed by rotating the first clamping elements 40 around the wire W by rotating the shaft 8 by the motor M4. The first clamping elements 4 are heated by the heater and the cut is formed around the insulation of the wire with the heated first clamping elements 4.

When the lead screw 62 is caused to rotate in the reverse direction by the motor M2 so as to move the first actuator 6 forwardly, the guide rollers 42 are guided on the guide surfaces 60 of the first actuator 6 and the swing arms are caused to pivot such that the forward ends of the swing arms 41 move away from each other and the rear ends of the swing arms 41 move toward each other.

As soon as the lead screw 62 is reversely rotated by the motor M2, the motor M3 is then actuated to rotate the lead screw 72 so as to move the second actuator 7 forwardly. When the second actuator 7 moves forwardly, the guide rollers 52 are guided on the guide surfaces 70 of the second actuator 7 and the swing arms 51 are caused to pivot such that the forward ends of the swing arms 51 move toward each other and the rear ends of the swing arms 51 move away from each other. When the guide rollers 52 move to the rear end of the guide surfaces 70, the edges 50 of the second clamping elements 5 grasp a rearward portion of the insulation of the wire immediately adjacent to the cut formed by the first clamping elements 4, followed by moving the stripping mechanism rearwardly via the slide mechanism by the motor M5 while simultaneously rotating the shaft 8 by the motor M4 thereby removing the insulation from the wire and twisting the core.

When the lead screw 72 is caused to rotate in the reverse direction by the motor M3 so as to move the second actuator 7 rearwardly, the guide rollers 52 are guided on the guide surfaces 70 of the second actuator 7 and the swing arms 51 are caused to pivot such that the forward ends of the swing arms 51 move away from each other and the rear ends of the swing arms 51 move toward each other. The removed insulation is sucked from the forward opening of the shaft 8 and collected from the rear opening of the shaft 8 by the suction means.

The stripping mechanism is movable along the lengthwise direction of the wire W held by the clamping device 2 so that the clamping position by the second clamping elements 5 can be adjusted by slightly moving the stripping mechanism backward, for example, after forming the cut in the insulation by the first clamping elements 4.

An exemplary implementation has been described in accordance with FIG. 1 in which the first and second clamping elements 4 and 5 are provided at the forward ends of the swing arms 41 and 51 respectively. The edges 40 and 50 move substantially perpendicular to the lengthwise direction of the wire though the edges 40 and 50 follow arcuate paths by pivotal movement of the swing arms 41 and 51.

Figure 8:
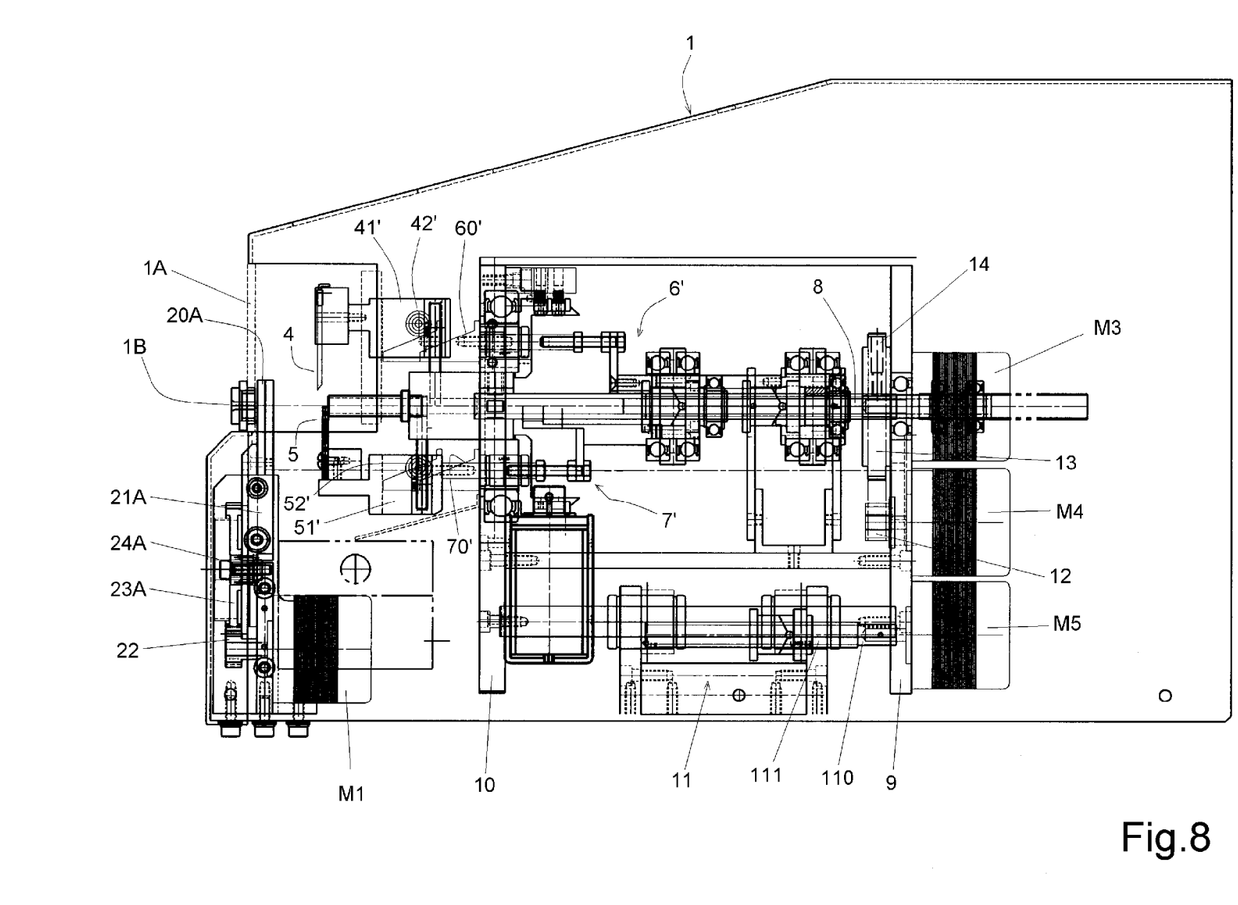
FIG. 8 is a view similar to FIG. 1 showing an alternative embodiment of the stripping apparatus.
Figure 9:
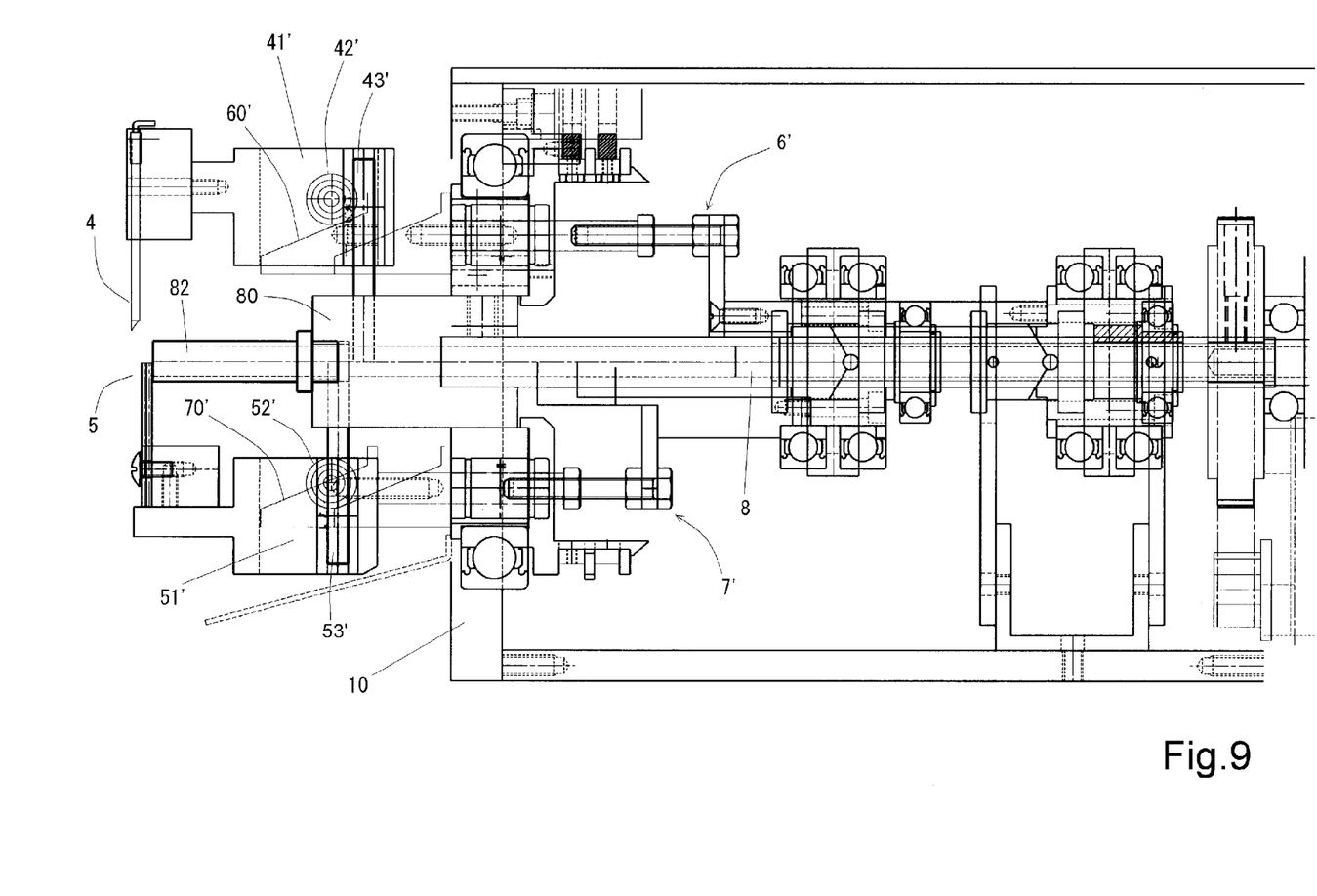
FIG. 9 shows a stripping mechanism of FIG. 8.

FIGS. 8 and 9 are view showing an alternative embodiment of stripping apparatus in which the edges 40 and 50 move toward and away from each other perpendicular to the lengthwise direction of the wire. The stripping apparatus is provided with the positioning device 3 though not shown in FIG. 8. The same reference numerals are used in the drawings and description to refer to the same or substantially the same parts and operations.

Referring to FIGS. 8 and 9, a pair of first clamping elements 4 is provided on a pair of first movable blocks 41' which move toward and away from one another perpendicular to the length of the wire. The first movable block 41' moves along a first guide shaft 43' that is connected to the head portion 80 of the shaft 8 and extended perpendicular to the lengthwise direction of the shaft 8. Each first movable block 41' may move along two parallel first guide shafts 43'. The pair of first movable blocks 41' is spring-biased by a spring not shown in a direction such that the edges 40 of the first clamping elements 4 move toward each other by a spring force.

A pair of second clamping elements 5 is provided on a pair of second movable blocks 51' which move toward and away from one another perpendicular to the length of the wire. The second movable block 51' moves along a second guide shaft 53' that is connected to the head portion 80 of the shaft 8 and extended perpendicular to the lengthwise direction of the shaft 8. Each second movable block 51' may move along two parallel first guide shafts 53'. The pair of second movable blocks 51' is spring-biased by a spring not shown in a direction such that the edges 50 of the second clamping elements 5 move away from each other by a spring force.

The stripping mechanism comprises a first actuator 6' for causing the first clamping elements 4 to move toward and away from one another, and a second actuator 7' for causing the second clamping elements 5 to move toward and away from one another.

The first actuator 6' comprises a tapered cam surface 60' at a forward end. The first movable block 41' comprises a cam follower 42' to contact the tapered cam surface 60'. Each first movable block 41' may move along two spaced-apart parallel first guide shafts 43' and the cam follower 42' may be provided between portions for receiving fist guide shafts 43'. The first actuator 6' is reciprocally movable along the lengthwise direction of the shaft 8 and rotatable about the shaft 8 similar to the actuator 6 in FIG. 2.

The second actuator 7' comprises a tapered cam surface 70' at a forward end. The second movable block 51' comprises a cam follower 52' to contact the tapered cam surface 70'. Each second movable block 51' may move along two spaced-apart parallel second guide shafts 53' and the cam follower 52' may be provided between portions for receiving fist guide shafts 53'. The second actuator 7' is reciprocally movable along the lengthwise direction of the shaft 8 and rotatable about the shaft 8 similar to the actuator 7 in FIG. 3.

The similar configuration using a tapered cam surface and a cam follower is disclosed in U.S. Pat. No. 6,370,759, which is incorporated herein by reference.

According to the stripping apparatus shown in the drawings, a wire W is oriented and extended in a substantially horizontal direction and supplied to the apparatus horizontally. A wire may be supplied to the apparatus vertically by providing a vertically oriented stripping apparatus as shown in U.S. Pat. No. 6,370,759, for example.

While illustrative embodiments have been illustrated and described, it will be appreciated that various changes can be made therein without departing from the spirit and scope of the invention.

The embodiments of the invention in which an exclusive property or privilege is claimed are defined as follows:

1. A wire stripping apparatus comprising:
a clamping device for holding a first portion of a wire comprising a core and an insulation around the core;
a wire stripping mechanism;
a casing for housing said clamping device and said wire stripping mechanism; and
a wire insertion aperture provided in a wall of the casing, said wire stripping mechanism comprising:
a shaft being rotatably supported and extended in the lengthwise direction of the wire;
a cutter having a pair of first clamping elements, said first clamping elements being movable toward and away from each other in a first direction and rotatable together with the rotation of the shaft wherein said first clamping elements move toward each other to contact a second portion of the wire and rotate about the wire so as to provide a cut in the insulation of the wire at the second portion of the wire;

a remover having a pair of second clamping elements, said second clamping elements being movable toward and away from each other in a second direction and rotatable together with the rotation of the shaft wherein said first and second directions are orthogonal one another and substantially perpendicular to the lengthwise direction of the wire and wherein said second clamping elements move toward each other to grasp a third portion of the wire immediately adjacent to the second portion of the wire away from the first portion of the wire; and said remover being movable in the lengthwise direction of the wire wherein said remover grasping the third portion of the wire moves in the lengthwise direction away from the first portion of the wire toward an end of the wire while rotating about the wire to remove the insulation from the wire.

2. The wire stripping apparatus of claim 1 wherein said first clamping elements are adapted to be heated to provide the cut by melting the insulation.

3. The wire stripping apparatus of claim 1 wherein said first clamping elements comprise a blade cutting into the insulation.

4. The wire stripping apparatus of claim 1, said wire stripping mechanism further comprising a first actuator being reciprocally movable along the shaft and a second actuator being reciprocally movable along the shaft wherein said first actuator causes said first clamping elements to move toward and away from each other in the first direction and said second actuator causes said second clamping elements to move toward and away from each other in the second direction.

5. The wire stripping apparatus of claim 1, further comprising a positioning device for determining said first portion being provided between said wire insertion aperture and said wire stripping mechanism, and said positioning device being rotatable between a first position in which said positioning device is to be contacted by the tip of wire received in said wire insertion aperture and a second portion in which said positioning device is away from the wire held by said clamping device.

6. The wire stripping apparatus of claim 1 wherein said shaft comprises a hollow portion having a first open end and a second open end and wherein said first end is provided facing the end of the wire, said hollow portion is sized to receive and allow passage of the insulation removed from the wire.

7. The wire stripping apparatus of claim 1 wherein said stripping mechanism is movable in the lengthwise direction of the wire and said remover is moved in the lengthwise direction of the wire together with said stripping mechanism by moving the stripping mechanism.

8. The wire stripping apparatus of claim 6, wherein the second open end of the shaft is connectable to a suction source.

* * * * *